(12) United States Patent
Jordan et al.

(10) Patent No.: US 7,550,076 B2
(45) Date of Patent: Jun. 23, 2009

(54) SYSTEM FOR THE TREATMENT OF WASTEWATER

(75) Inventors: Edward J. Jordan, Lenexa, KS (US); James E. Augustyn, Olathe, KS (US)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 11/867,311

(22) Filed: Oct. 4, 2007

(65) Prior Publication Data

US 2008/0105602 A1    May 8, 2008

Related U.S. Application Data

(60) Provisional application No. 60/828,402, filed on Oct. 6, 2006.

(51) Int. Cl.
*C02F 3/00* (2006.01)

(52) U.S. Cl. .................. 210/150; 210/151; 210/173; 210/174

(58) Field of Classification Search ......... 210/150–151, 210/173–174
See application file for complete search history.

(56) References Cited

U.S. PATENT DOCUMENTS

| | | | | |
|---|---|---|---|---|
| 4,032,446 A | * | 6/1977 | Miller, Jr. ................... | 210/173 |
| 4,618,426 A | * | 10/1986 | Mandt ........................ | 210/620 |
| 4,645,592 A | | 2/1987 | Calltharp et al. ............ | 210/142 |
| 4,857,185 A | * | 8/1989 | Desjardins ................... | 210/150 |
| 4,973,432 A | * | 11/1990 | Desjardins et al. ............ | 261/76 |
| 5,098,567 A | * | 3/1992 | Nishiguchi ................... | 210/614 |
| 5,151,187 A | | 9/1992 | Behmann ..................... | 210/607 |
| 6,960,304 B1 | | 11/2005 | Brown et al. ................ | 210/749 |
| 2004/0144727 A1 | * | 7/2004 | McCoy ........................ | 210/668 |

OTHER PUBLICATIONS

International Search Report dated May 7, 2008 for Application No. PCT/US07/21342.
Written Opinion of the International Searching Authority dated May 7, 2008 for Application No. PCT/US07/21342.

* cited by examiner

*Primary Examiner*—Chester T Barry
(74) *Attorney, Agent, or Firm*—Pasquale Musacchio

(57) ABSTRACT

A wastewater treatment system for treating wastewater by processes which include aeration. The system includes an influent conduit for delivery of wastewater to be processed and a treatment tank for processing of the wastewater. Also included is an air conduit for providing compressed air for aeration of the wastewater and a particle size regulation device disposed between the conduit and the tank, wherein the particle size regulation device regulates a size of particles present in the wastewater to provide particle size regulated wastewater. The system also includes at least one aeration jet having a nozzle diameter sized to allow the particle size regulated wastewater to pass through the nozzle.

14 Claims, 2 Drawing Sheets

SYSTEM FOR THE TREATMENT OF WASTEWATER

CROSS REFERENCE TO RELATED APPLICATION AND PRIORITY CLAIM

This application claims priority under 35 USC § 119(e) to U.S. Provisional Application No. 60/828,402 filed on Oct. 6, 2006 in the name of Edward J. Jordan and James E. Augustyn and entitled METHOD AND SYSTEM FOR THE TREATMENT OF WASTEWATER, which is herein incorporated by reference in its entirety.

FIELD OF THE INVENTION

The present invention relates to a method and a system for the treatment of wastewater. In particular, the invention relates to a system for treating wastewater which utilizes an aeration nozzle which is sized to enable particle size regulated wastewater to pass through the nozzle.

BACKGROUND OF THE INVENTION

Any discussion of the prior art throughout the specification should in no way be considered as an admission that such prior art is widely known or forms part of the common general knowledge in the field.

Processes for the treatment of wastewater are known which include biological steps, in which the wastewater is treated with micro-organisms; and separation steps, in which liquids and solid material are separated.

The biological steps require that the wastewater be aerated and mixed or agitated. Some known methods and systems for the treatment of wastewater use fine bubble diffusers to aerate the wastewater and a separate mixing device to effect mixing and agitation.

It is recognised that the processing of wastewater having higher mixed liquor suspended solids (MLSS) has certain advantages. Unfortunately, the use of fine bubble diffusers in the processing of high MLSS wastewater is inconvenient for two main reasons. One reason is that as the mixed liquor concentration increases, the efficiency of the diffuser greatly decreases. A second reason is that fine bubble diffusers foul more rapidly in a very high suspended solids environment and require more maintenance and more frequent replacement.

Further known systems use gas jets to aerate the wastewater. When compared with fine bubble diffusers, the use of jets is advantageous in a number of respects. For example, alpha values for jet aeration systems tend to be higher generally than those for diffusers, in part due to higher mixing forces generated by jet aeration. Further, jet aerators tend to retain their higher alpha values during operation, even at higher MLSS. Jet aeration also serves to agitate and mix the wastewater, eliminating or reducing the need for separate mixing and agitation.

However, the running costs of the blowers used with jet aerators are highly energy intensive and may add significantly to the operating costs. It is an object of the present invention to overcome or alleviate at least one of the disadvantages of the prior art, or to provide a useful alternative.

SUMMARY OF THE INVENTION

A wastewater treatment system for treating wastewater by processes including aeration is disclosed. The system includes an influent conduit for delivery of wastewater to be processed and a treatment tank for processing of the wastewater. A particle size regulation device is disposed in the influent conduit for reducing the size of particles suspended in the wastewater and/or removing particles above a threshold size from the wastewater to produce particle-size-regulated wastewater. The system further includes at least one aeration jet having a nozzle diameter selected to allow the particle-size-regulated wastewater to pass through it, said nozzle diameter being less than approximately 1.5 inches (38 mm).

DETAILED DESCRIPTION OF THE INVENTION

Figure 1:
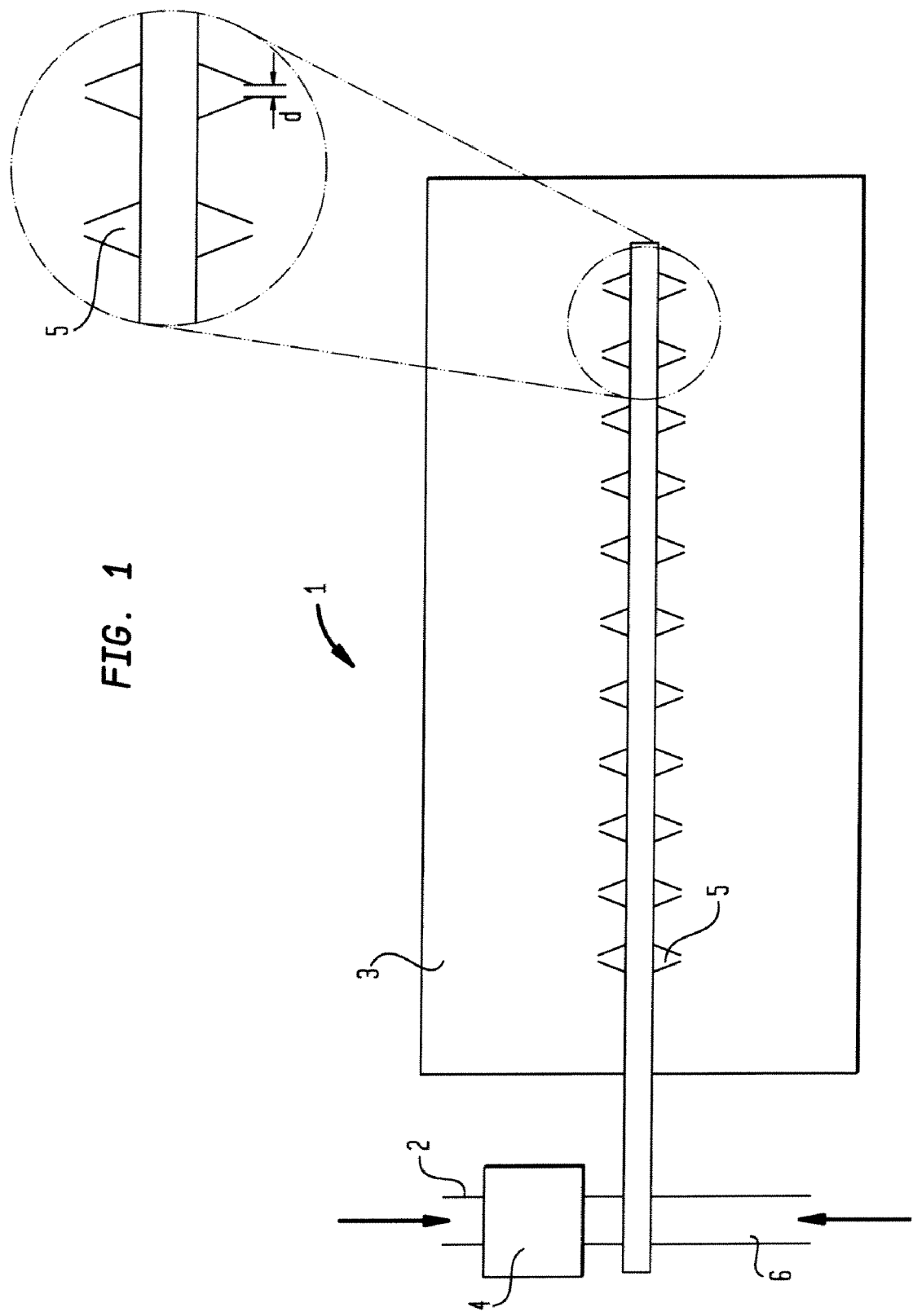
FIG. 1 is a partially schematic plan view of parts of a wastewater treatment facility illustrating one embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of FIGS. 1-2.

Referring to FIG. 1, a first embodiment of a wastewater treatment system 1 according to the invention includes an influent conduit 2 for delivery of wastewater to be processed to a treatment tank 3 for processing of the wastewater.

A particle size regulation device 4, such as a screen, is disposed in the influent conduit 2 for reducing the size of particles suspended in the wastewater and/or removing particles above a threshold size from the wastewater to produce particle-size-regulated wastewater. While a screen may regulate particle size by removing large particles, in other embodiments a particle size regulation device is used which actively reduces the size of particles in the wastewater, for example by shredding or mastication.

At least one aeration jet 5 is provided having a nozzle diameter, d. The jet 5 may be conical in shape. The nozzle diameter is selected to allow the particle-size-regulated wastewater to pass through it. To obtain improved energy efficiency and therefore to reduce costs, the particle size regulation device 4 is designed or selected to produce particle-size-regulated wastewater which may pass through a nozzle having a diameter of less than approximately 1.5 inches (38 mm) without excessive fouling of the nozzle. In more preferred embodiments, the particle size regulation device is such that nozzle sizes of less than approximately 1.4 inches (36 mm), less than approximately 1.25 inches (32 mm), less than approximately 1.1 inches (28 mm) or approximately 1 inch (25 mm) may be used.

The current invention provides a wastewater treatment method and system including jet aeration having high alpha and increased efficiency and reliability, and lower operating costs. By way of example, the use of nozzles having a diameter of approximately 1 inch (25 mm) is calculated to be likely to afford a saving in the cost of operating aeration blowers of approximately 10%.

A compressed air conduit 6 is also provided for the delivery of compressed air for aeration of the wastewater. Delivery mechanisms, nozzles and so on for the mixing and delivery of aerated wastewater to the treatment tank are well known to those having skill in the art.

In some embodiments, the wastewater treatment system includes a sequencing batch reactor (SBR). In other embodiments, the system includes a membrane bioreactor (MBR).

Figure 2:
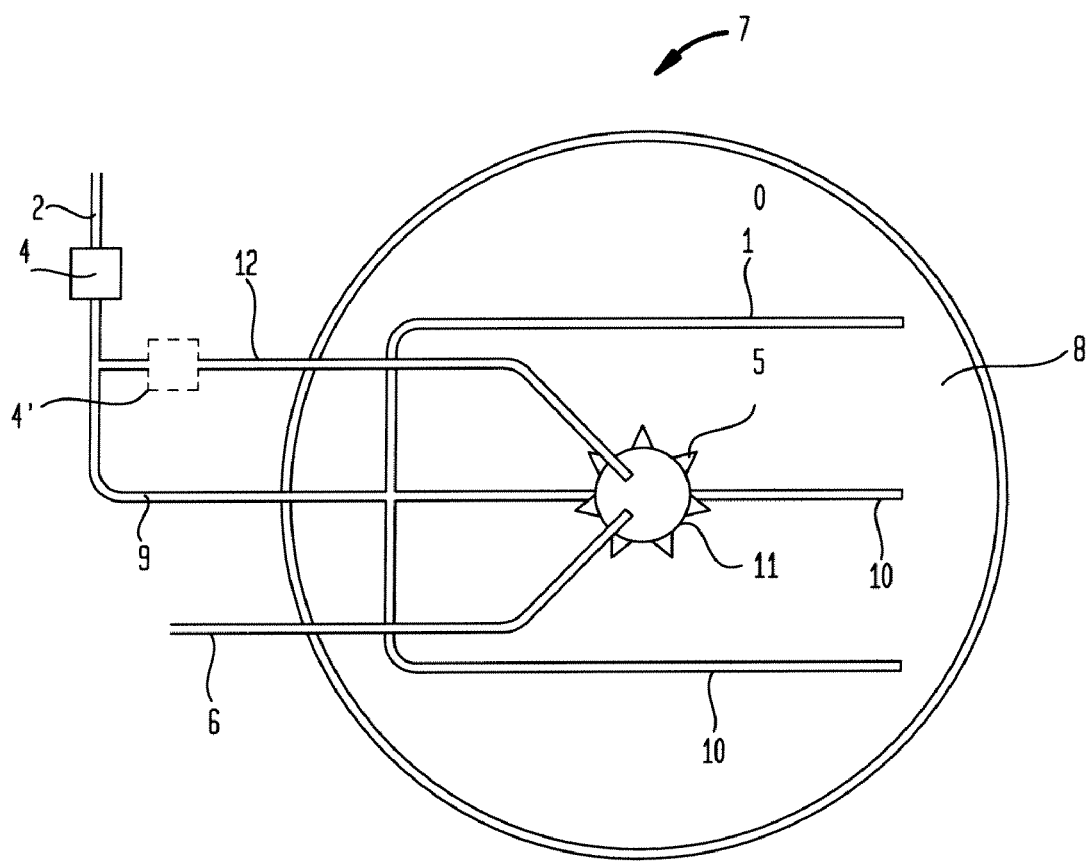
FIG. 2 is a partially schematic plan view of a wastewater treatment facility illustrating further embodiments of the invention.

FIG. 2 illustrates further embodiments of the invention including an SBR treatment tank. The reference numeral 7 generally designates a wastewater treatment facility including a tank 8 for treatment of wastewater with microorganisms and aeration. A main delivery portion 9 of an influent conduit 2 delivers wastewater to the tank via distribution conduits 10, and to a distribution hub 11 via an aeration wastewater portion 12 of the influent conduit 2. A compressed air conduit 6 delivers compressed air for aeration to the distribution hub 11. A plurality of aeration jets 5 are provided around the distribution hub. The jets 5 may be conical in shape. Suitable arrangements of conduits, distribution hubs and jets are well-known to those skilled in the art.

A particle size regulation device 4 of a type known in the art, such as a screen, shredder or masticator, is provided in the influent conduit to regulate the size of particles in the wastewater delivered to the tank and the distribution hub. In an alternative embodiment, the particle size regulation device 4' (shown as dashed line) is provided in the aeration wastewater portion 12 of the influent conduit such that the particle size is regulated only in that portion of the wastewater which enters the tank via the aeration jets 5.

The aeration jets 5 each have nozzles having a diameter selected to ensure that they may deliver wastewater which has passed through the particle size regulation device 4. Again, the particle size regulation device used is designed or selected to produce particle-size-regulated wastewater which may pass through a nozzle having diameter of less than approximately 1.5 inches (38 mm) without excessive fouling of the nozzle. In more preferred embodiments, the device is such that nozzle sizes of less than approximately 1.4 inches (36 mm), less than approximately 1.25 inches (32 mm), less than approximately 1.1 inches (28 mm) or approximately 1 inch (25 mm) may be used.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims. For example, although the invention has been described with reference to a specific example of an embodiment in a sequencing batch reactor, it will be appreciated by those skilled in the art that the invention may be embodied in many other forms including, as stated, in membrane biological reactors (MBRs).

What is claimed is:

1. A wastewater treatment system for treating wastewater, comprising:
   an influent conduit for delivery of wastewater to be processed;
   a treatment tank for processing of said wastewater;
   an air conduit for providing compressed air for aeration of said wastewater;
   a particle size regulation device disposed between said conduit and said tank, wherein said particle size regulation device reduces a size of particles present in said wastewater and removes particles above a threshold size to provide particle size regulated wastewater; and
   at least one aeration jet having a nozzle diameter sized to allow said particle size regulated wastewater to pass through said nozzle.

2. A system according to claim 1, wherein said diameter is less than approximately 1.5 inches.

3. A system according to claim 1, wherein said diameter is less than approximately 1.0 inches.

4. A system according to claim 1, wherein said particle size regulation device is a screen.

5. A system according to claim 1, wherein said particle size regulation device reduces a size of particles present in said wastewater by shredding.

6. A system according to claim 1, wherein said particle size regulation device reduces a size of particles present in said wastewater by mastication.

7. A system according to claim 1, wherein said system includes a sequence batch reactor.

8. A system according to claim 1, wherein said system includes a membrane bioreactor.

9. A wastewater treatment system for treating wastewater, comprising:
   an influent conduit for delivery of wastewater to be processed;
   a distribution hub;
   an aeration wastewater portion for delivering wastewater from said influent conduit to said distribution hub,
   a treatment tank for processing of said wastewater;
   an air conduit for providing compressed air to said distribution hub for aeration of said wastewater;
   a particle size regulation device disposed in said aeration wastewater portion, wherein said particle size regulation device reduces a size of particles present in said wastewater and removes particles above a threshold size to provide particle size regulated wastewater; and
   at least one aeration jet disposed on said distribution hub, said at least one aeration jet having a nozzle diameter sized to allow said particle size regulated wastewater to pass through said nozzle.

10. A system according to claim 9, wherein said diameter is less than approximately 1.5 inches.

11. A system according to claim 9, wherein said diameter is less than approximately 1.0 inches.

12. A system according to claim 9, wherein said particle size regulation device is a screen.

13. A system according to claim 9, wherein said particle size regulation device reduces a size of particles present in said wastewater by shredding.

14. A system according to claim 9, wherein said particle size regulation device reduces a size of particles present in said wastewater by mastication.

* * * * *